(12) United States Patent
Cueff et al.

(10) Patent No.: US 6,554,040 B1
(45) Date of Patent: Apr. 29, 2003

(54) DEVICE FOR PLACING A JOINT ON A VEHICLE BODY AND METHOD TO IMPLEMENT SAID DEVICE

(75) Inventors: Jean-Yves Cueff, Wissous (FR); Alain De Bentzmann, Versailles (FR); Jean-Paul Rousse, Nantes (FR)

(73) Assignees: Process Conception Ingenierie S. A. (FR); Technorop Automation (FR)

( * ) Notice: Subject to any disclaimer, the term of this patent is extended or adjusted under 35 U.S.C. 154(b) by 0 days.

(21) Appl. No.: 09/532,084

(22) Filed: Mar. 21, 2000

Related U.S. Application Data

(63) Continuation of application No. PCT/FR99/01752, filed on Jul. 16, 1999.

(30) Foreign Application Priority Data

Jul. 21, 1998 (FR) .............................. 98 09291

(51) Int. Cl.⁷ .................. B60J 10/00; B23P 19/02
(52) U.S. Cl. ............... 156/391; 156/443; 156/475; 156/494; 29/235; 29/281.6; 29/282
(58) Field of Search ................. 156/391, 443, 156/475, 494; 29/235, 282, 281.6, 450, 451, 452

(56) References Cited

U.S. PATENT DOCUMENTS

| | | | | |
|---|---|---|---|---|
| 4,528,736 A | * | 7/1985 | Hope et al. | 29/235 |
| 4,620,354 A | * | 11/1986 | Hess et al. | 29/417 |
| 4,653,166 A | | 3/1987 | Bright | 29/235 |
| 5,060,358 A | * | 10/1991 | Haas et al. | 29/235 |
| 5,179,774 A | * | 1/1993 | Massie | 29/451 |

FOREIGN PATENT DOCUMENTS

| | | |
|---|---|---|
| DE | 36 38 176 | 5/1988 |
| FR | 2 646 370 | 11/1990 |

* cited by examiner

*Primary Examiner*—Richard Crispino
*Assistant Examiner*—Sue A. Purvis
(74) *Attorney, Agent, or Firm*—Pennie & Edmonds LLP

(57) ABSTRACT

A device for placing a seal, such as a water seal, on a motor vehicle body. This device includes a jig which is placed in contact with the body of the motor vehicle, a carriage borne by the jig and able to move on the latter so as to ensure placement of the seal, and rails for guiding and orienting the carriage on the jig. A method for operating this device is also disclosed.

17 Claims, 4 Drawing Sheets

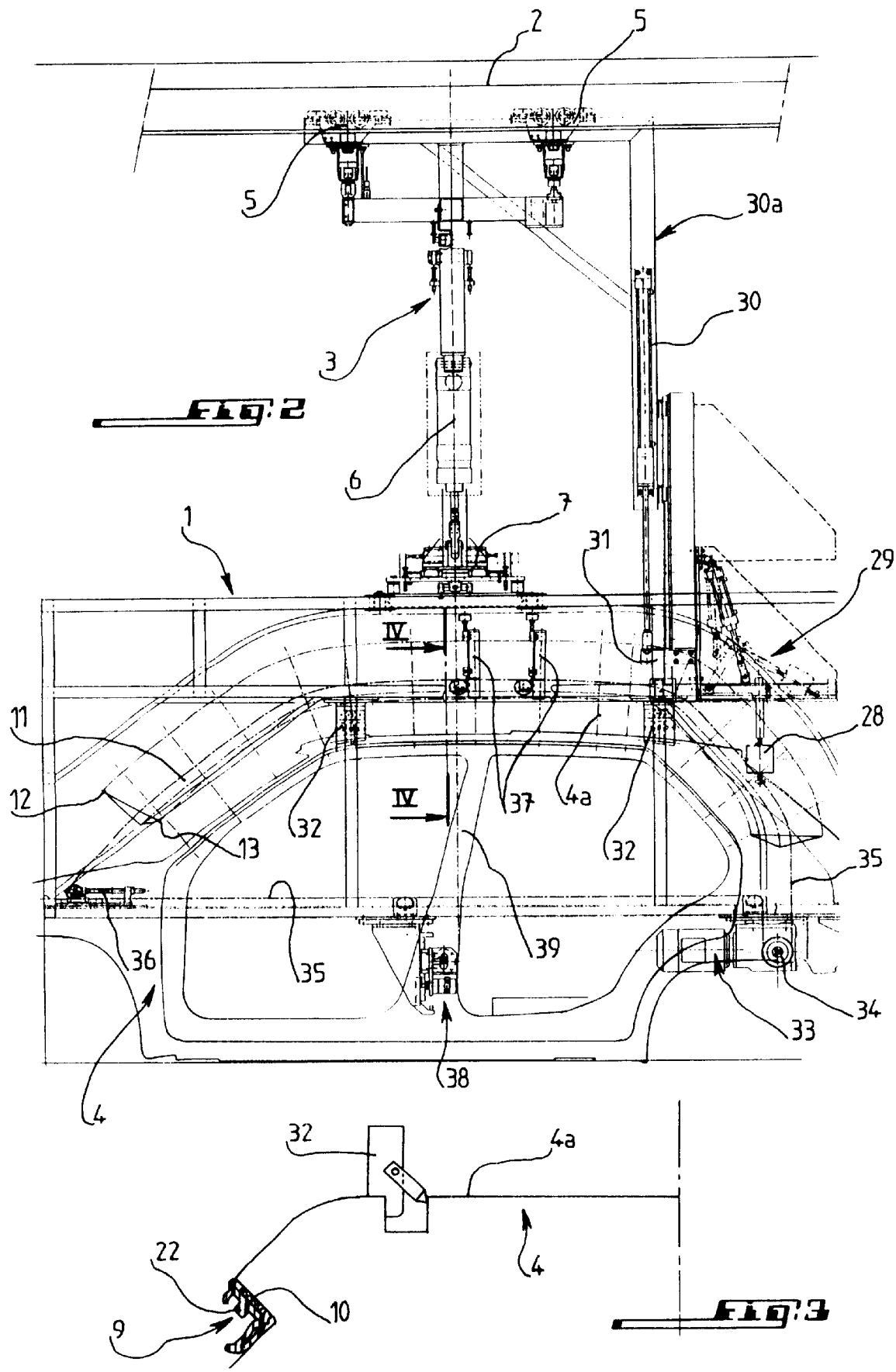

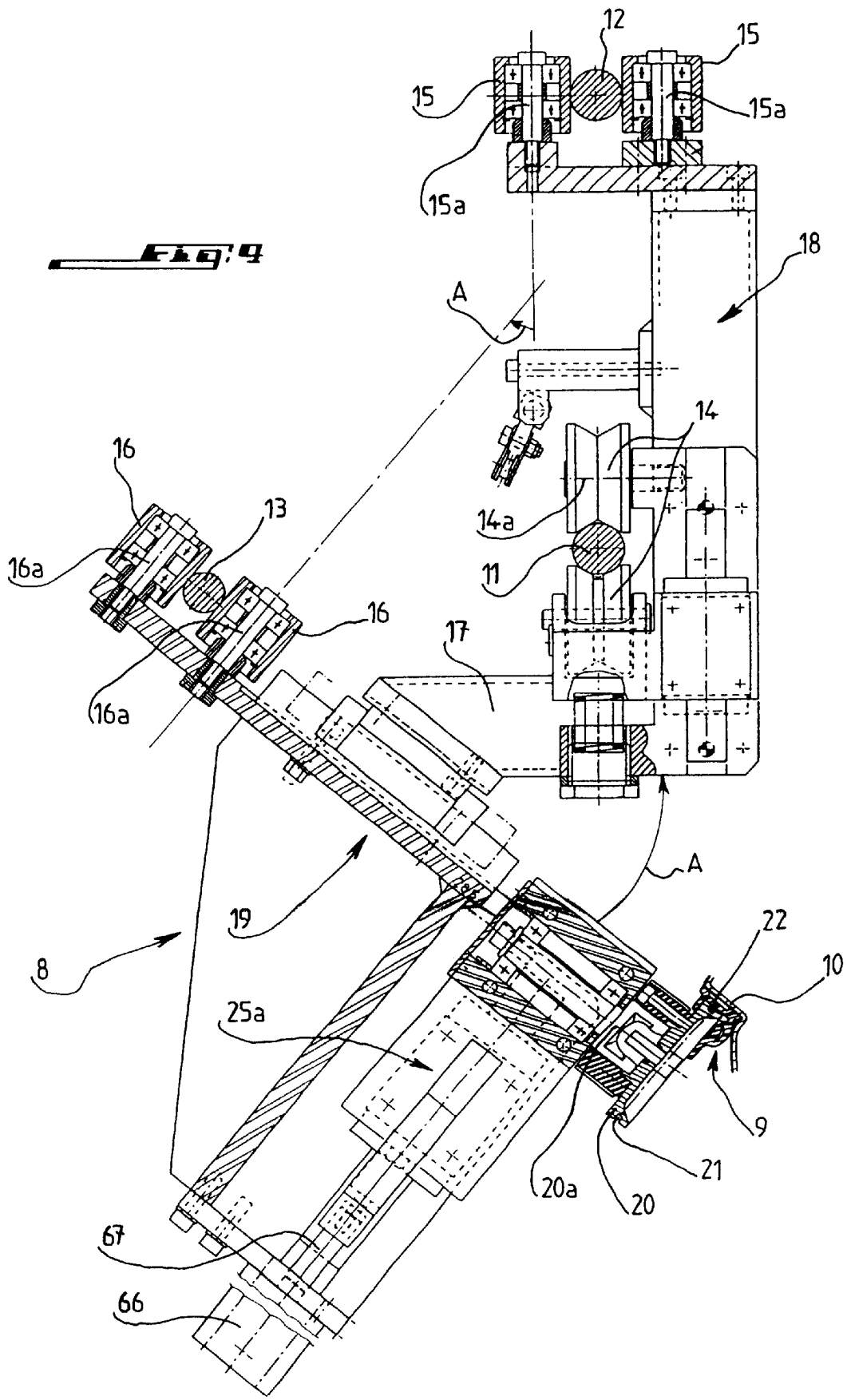

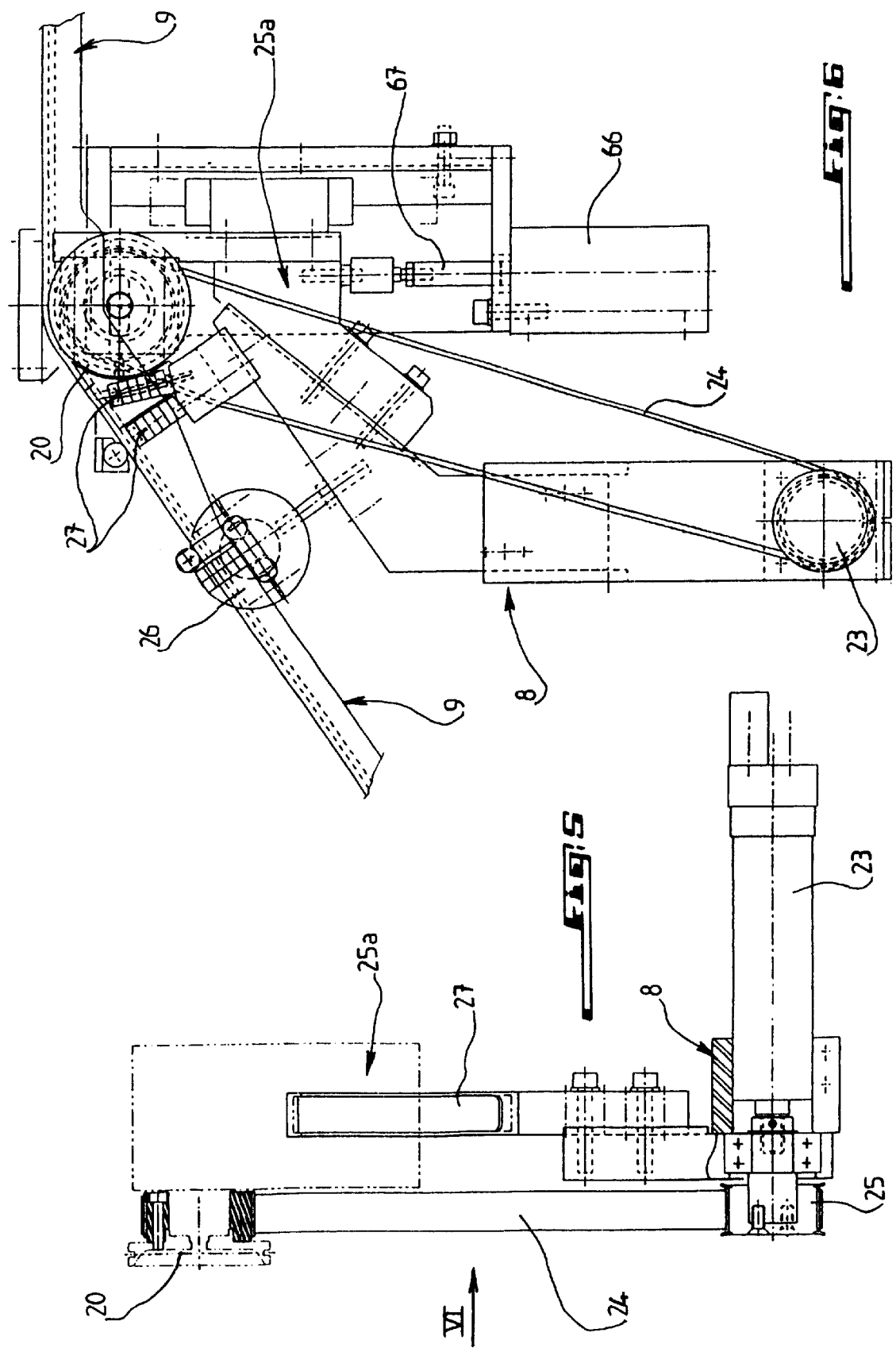

DEVICE FOR PLACING A JOINT ON A VEHICLE BODY AND METHOD TO IMPLEMENT SAID DEVICE

This application is a continuation of International Application PCT/FR99/01752 filed Jul. 16, 1999, the content of which is expressly incorporated herein by reference thereto.

FIELD OF THE INVENTION

The present invention basically concerns a device to place a joint, such as a water jet joint, on a motor vehicle body.

BACKGROUND OF THE INVENTION

It also concerns a method to implement said device.

The expression "water jet seal" or "drip moulding seal" denotes a seal intended to be placed on the body of the vehicle at the upper portion of the door frame and used firstly to ensure that water does not trickle along the window pane or penetrate inside the passenger compartment, and secondly to limit aerodynamic noise.

To date, no device and method are available for glueing a water jet seal onto a motor vehicle body able to be automated and reliable with respect to the positioning of the seal on the vehicle, the pressurizing force of the seal on the corresponding surface of the body, and the fixing operation by glueing the seal onto the receiving surface of the body, this operation often proving to be ineffective and resulting in the long run to the seal being detached from the body.

SUMMARY OF THE INVENTION

The present invention also seeks to resolve this drawback.

To this effect, the invention concerns a device for placing a seal, such as a water jet seal, onto a motor vehicle body, characterised in that it basically includes: a jig able to be placed in contact with the body of the vehicle; a carriage borne by the jig and able to move onto the latter for placing the seal; and means to guide and orientate the carriage on the jig.

According to a preferred embodiment, the carriage orientation and guiding means include three rails, possibly approximately parallel, with a circular cross-section and integral with the jig, namely a first rail with a shape matching the shape of the receiving surface of the seal on the vehicle and defining the path the carriage is to follow along the body of the vehicle, a second rail keeping the force applied to the seal on its receiving surface along a direction constantly normal on the application surface of a seal, and a third rail ensuring along a direction transversal to the vehicle a correct positioning of the carriage with respect to the vehicle so that the seal is fully flush with the geometry of the body.

According to another characteristic of the device of this invention, the carriage comprises guiding rollers which co-operate bilaterally with the first, second and third rails respectively, the axes of the rollers co-operating with the first rail being orthogonal to the axes of the rollers co-operating with the second rail, and the axes of the rollers co-operating with the third rail forming an angle (A) with the axes of the rollers co-operating with the second rail.

Also according to another characteristic of this device, said carriage is made up of two elements, namely a first element bearing the rollers associated with the first and second rails, and a second element bearing the rollers associated with the third rail and slanted with respect to the first element along an angle equal to said angle (A).

Here, it shall be stated that said second element is fitted with a roller for applying the seal on the receiving surface, the axis of this roller being orthogonal to the axis of the rollers associated with the third rail.

According to a preferred embodiment, the roller for applying the seal has a throat co-operating with the seal so as to ensure it is applied and positioned on the receiving surface and is driven in rotation by a motor integral with the carriage.

According to a further characteristic of the invention, said application roller is mounted on an element able to activated by a jack or similar device integral with the carriage so as to exert a controlled application force of the seal on the receiving surface.

Again here it shall be stated that associated with the jig is a suspended adjustable stop able to co-operate with the body of the vehicle so as to ensure the correct prepositioning of the jig on said body and subsequently its drive.

The jig is mounted suspended and rolling on a rail by means of arms, one of which bearing said stop.

According to another characteristic of the invention, the jig is kept hooked on the body by means of brackets co-operating with the roof of said body.

The jig is further fitted with a motor for driving the carriage by means of a chain or similar element.

The invention also concerns a method to implement a device meeting the characteristics mentioned above and which is basically characterised in that when said stop has struck an extremity of the body, the jig is plated and flanged on the side of the body and said carriage is moved on the jig, whereas pressure is exerted on said application roller so as to glue the seal on the receiving surface.

According to another characteristic of this method, said application roller rotates quicker than a single free rolling of this roller on the seal.

Thus, instead of using a free rolling roller on the seal, which would provoke not only pressurizing of the seal but also a. consequent elongation of the latter by the significant force crushing the sole of the seal so that the seal would risk being subsequently retracted and come away from certain portions of the body, it is possible, by advantageously making the roller rotate faster than a simple free rolling, to create friction between the roller and the seal and thus compression in the longitudinal direction of the seal which reduces or annuls said elongation and in the long run ensures that the seal remains on the body of the vehicle.

BRIEF DESCRIPTION OF THE DRAWINGS

Other advantages and characteristics of the invention shall appear more readily from a reading of the following detailed description with reference to the accompanying drawings given solely by way of example and on which:

FIG. 2 is a front view of this device, the carriage being removed for the sake of clarity, along the arrow 11 of FIG. 1.

FIG. 3 is a highly diagrammatic partial half view of the body shown transversally to the median longitudinal axis of the vehicle and illustrating the hooking of the jig on the vehicle.

FIG. 4 shows a section of the carriage along the line IV—IV of FIG. 2, although said carriage is not shown on this figure.

FIG. 5 is a side view with partial sections of the portion of the carriage comprising the seal application roller and the mechanism for driving said roller.

FIG. 6 is a view similar to FIG. 5, but along the arrow VI of FIG. 5.

DETAILED DESCRIPTION OF THE INVENTION

Figure 1:
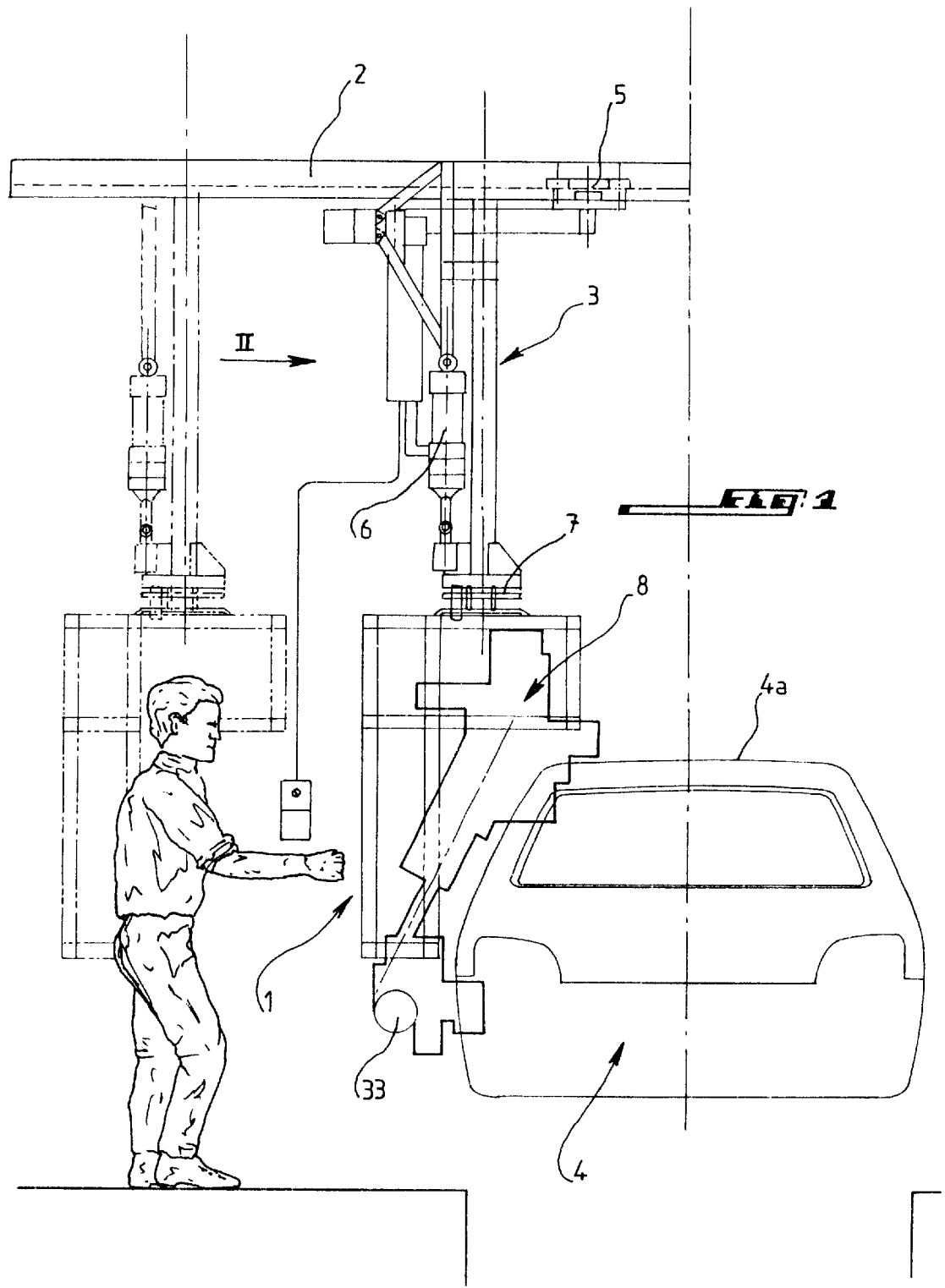
FIG. 1 is a side elevation and diagrammatic view of a device according to this invention and in a position applied on the side of the body of a vehicle.

As shown on FIGS. 1 and 2, a device according to the invention for placing a seal basically includes a jig 1 roughly having the shape of a frame or mechanical-welded support member mounted suspended and rolling on a rail 2 by means of an arm or similar element 3 so as to be able to be applied to the side of the body 4 of a motor vehicle. As can be seen later, the device of the invention can also be used if the vehicle is fixed to the work station and if it is moving continuously on the assembly line.

Shown at 5 are the rolling rollers of the device on the rail 2, at 6 a balancing jack inserted on the arm 3 and avoiding any excess load of the device on the body 4, and at 7 a hooking system with damping of the arm 3 on the jig 1.

Mounted rolling on the jig 1 with respect to said jig is a carriage diagrammatically shown at 8 on FIG. 1 and clearly visible on FIG. 4, this carriage 8 ensuring placing of the seal 9 shown on FIGS. 3, 4 and 6 on a receiving surface of the care body 4, said surface being shown at 10 on FIGS. 3 and 4.

The carriage 8 is guided and orientated on the jig 1 by a certain number of elements to be described subsequently in detail, it being understood that the shape of these elements and of the jig 1 correspond to a given type of vehicle or even to different versions of a given vehicle model having similar portions.

As shown on FIGS. 2 and 4, the jig 1 includes three rails for guiding the carriage 3, said rails being possibly approximately parallel depending on the geometry of the body and having a cross-section with a circular shape, namely:

a first rail 11 having a shape matching the shape of the receiving surface 10 and defining the path the carriage 8 is to follow along the body 4 of the vehicle a second rail 12 used to keep the application force of the seal 9 on the receiving surface 10 along a direction still normal to the application surface of said seal on said surface, and a third rail 13 which ensures along a direction transversal to the vehicle a correct positioning of the carriage 8 with respect to the vehicle so that the seal is fully flush with the geometry of the passenger compartment of the vehicle.

On FIG. 4, the carriage 8 comprises guiding rollers co-operating bilaterally with the three rails 11, 12 and 13 respectively.

More specifically, the bilateral guiding rollers 14 co-operating with the first rail 11 have their axes 14a orthogonal to the axis 15a of the bilateral guiding rollers 15 co-operating with the second rail 12.

As for the bilateral guiding rollers 16 co-operating with the third rail 13, their axes 16a form an angle A with the axes 15a of the rollers 15 co-operating with the second rail 12, this angle A being in the example shown about 40°.

As shown on FIG. 4, the carriage 8 is made up of two elements combined by an arm of similar element 17, namely:

a first vertical element 18 bearing the bilateral rollers 14 and 15 associated with the first rail 11 and second rail 12 respectively, and a second element 19 carrying the bilateral rollers 16 which are associated with the third rail 13. This element 19 is slanted with respect to the first element 19 along an angle A which is clearly the same angle as the angle formed between the axes 16a of the roller 16 associated with the third rail 13 and the axes 15a of the rollers 15 associated with the second rail 12.

In accordance with the invention, it is to be noted that the second slanted element 19 of the carriage 8 is equipped with a roller 20 for applying the seal 9 onto the receiving surface 10 of the body 4 of the vehicle.

The axis 20a of this roller is orthogonal to the axis 16a of the bilateral guiding rollers 16 co-operating with the third rail 13 so as to ensure along a direction transversal to the vehicle a correct positioning of the carriage so that the seal 9 is fully flush with the geometry of the vehicle.

The second or lower element 19 of the carriage 8 is translation-mobile with respect to the first element 18 along a direction forming with the first element an angle equal to the angle of inclination of the second element with respect to the first. This translation is provoked by the geometric variations of the third rail 13 when the carriage moves and ensures that the seal is still situated at the right of the receiving surface 10 and thus is still flush with the geometry of the passenger compartment side.

The application roller 20 has a throat 21 into which a portion 22 of the seal 9 penetrates so that said seal is correctly supported, applied and guided or positioned transversally on the receiving surface 10 along a direction still normal to the surface on which said seal is applied.

In accordance with the invention, the roller 20 for applying the seal 9 on the receiving surface 10 is driven in rotation by a motor shown at 23 on FIGS. 5 and 6 at a speed slightly faster than that of a simple free rolling of the carriage 8 on the jig 1, as shall be explained later in detail.

FIGS. 5 and 6 show the motor 23, which may be a pneumatic motor, which drives the roller 20 in rotation by means of a belt 24 mounted between said roller and a gear or similar element 25 fixed on the outlet shaft of the motor 23.

Moreover, the roller 20 is mounted on an element 25a able to be activated by a jack 66 whose rod is shown at 67, this jack 66 being of course integral with the carriage 8 and thus making it possible by means of the roller 20 to exert an application force of the seal 9 on the receiving surface 10.

As can be seen on FIGS. 3 and 4, the shape of the cross section of the seal 9 is approximately an L, and as can be seen from left to right on FIG. 6, before being placed on the receiving surface 10, this seal is orientated by an element 26 integral with the carriage 8 which also comprises fingers 27 for moving the two branches or lips of the seal to the correct position, after which the seal 9 is received in the throat 21 of the roller 20 so as to be able to be placed and applied on the receiving surface, as shown on the upper right portion of FIG. 6.

With reference again to FIG. 2, it can be seen that the jig 1 is fitted with an adjustable suspended stop 28 able to co-operate with the body 24 of the vehicle so as to ensure the correct positioning of the jig 1 on said body, as shall be described later in detail. This stop 28 is integral with a piece of equipment 29 able to tilt vertically up or down by the fact that said stop 28 is carried by a unit 31 connected to a jack 30 borne by an arm 30a, this jack able to lift up the stop 28 and its support when the jig returns to its initial position between two consecutive vehicles. It shall be observed that the arm 30a is approximately parallel to the arm 3 supporting the jig 1.

FIG. 3 diagrammatically shows brackets 32 integral with the jig 1 and making it possible to hook the latter on the roof 4a of the body 4 of the vehicle when said jig has been applied and positioned on the side of the body, as can be seen on FIG. 2. Of course, without departing from the context of the invention, it is possible to use other means for hooking the jig 1 onto the body 4 of the vehicle.

FIG. 2 shows at 33 a motor for driving the carriage 8 (not shown on this figure for reasons of clarity) and whose outlet shaft 34 drives a chain, belt or similar element 35 positively connected to the carriage 8 and passing around a tensioning element 36.

FIG. 2 also shows means 37 for adjusting the rails 11, 12 and 13, said brackets 32 for hooking the jig 1 on the roof 4a of the body, and means 38 for positioning and locking the jig 1 on the middle foot 39 of the care body 4 according to a direction parallel to the median longitudinal axis of the body 4.

After having described the device of the invention, there now follows a description of implementation of said device.

As can be seen on FIG. 1, with the aid of remote control, the operator places the device in a start position, that is basically the jig/carriage unit.

The stop 28 is lowered and placed in the active position shown on FIG. 2.

The body 4, which is on a production chain, moves continuously, from the left to the right as shown on FIG. 2, until its rear portion strikes the stop 28.

The body 4 then drives the jig 1 with its associated carriage and the operator plates it according to a direction transversal to the vehicle along the body by applying a centering stop constituting said positioning means 38 on a body element integral with the receiving surface of the seal. Thus, the jig is auto-centred with respect to a cross axis of the vehicle. Secondly, the operator authorises a vertical descent of the jig 1 by means of the balancing jack 6 which makes it possible to place the hooking brackets 32 shown on FIG. 3. This movement is made possible by a relative mobility of the centering stop 38 with respect to the jig 1 solely along a vertical direction. As the jig is now perfectly positioned and referenced with respect to the body 4, the elements 32 and 38 ensure it is flanged on the latter.

It is to be noted that, prior to all the operations described above, the seal 9 has been inserted via its extremity inside the carriage 8, the rest of the seal being placed freely in a support spout (not shown).

The operator is thus now able to trigger the positioning cycle and pressurizing the seal 9 with the aid of the jack 26 exerting pressure on the roller 20 which ensures fixing of the seal 9 by glueing on the receiving surface 10. Then, by means of the relative movement of the carriage 8 with respect to the jig 1, the seal 9 is fixed on said receiving surface.

Here it shall be observed that the seal 9 is preferably a self-adhesive seal fitted with a protection film which is of course removed before positioning the application roller 20 on the receiving surface.

At the end of the cycle, that is when the carriage 8 with its associated roller 20 will have applied the seal 9 over the entire length of the receiving surface, the operator removes the jig 1 by moving it away from the body of the vehicle, the stop 28 being separated from said body.

Here it is important to note that, according to an essential characteristic of the invention, the roller 20 for applying the seal 9 on the receiving surface 10 is subjected to a rotation torque tending to make it rotate faster than a simple free rolling of said roller on the seal. This advantageously embodied by the motorisation of the roller 20 with the aid of the motor 23, which compresses the seal in a longitudinal direction which reduces or indeed annuls elongation of the 5 seal according to requirements and prevents it from becoming detached from the receiving surface in the long run in certain delicate locations, such as the rounded portions of the latter.

In fact, as explained at the start of this description, when the seal is placed by hand or via the free rolling of a roller, the seal is compressed at the level of the roller which provokes an elongation of the latter which risks bringing about the drawbacks mentioned earlier, these being advantageously avoided by the present invention by means of motorising the application roller 20.

Not only the separation stresses above are removed, but the fixing is extremely reliable owing to the significant glueing pressure and heating of the seal and the vehicle is advantageously removed. Any dilation of the seal and thus any possible cooling risking causing any ill-timed removal of the seal is advantageously avoided.

Of course, the invention is not merely limited to the embodiment shown and described which has been given solely by way of example.

On the contrary, the invention includes all the technical equivalents of the means described, as well as their combinations if these are carried out in accordance with the invention.

What is claimed is:

1. Device for placing a seal on a motor vehicle body, said device comprising:

a jig (1) able to be placed in contact with the body of the vehicle;

a carriage (8) borne by the jig (1) and able to move on the jig (1) so as to ensure placing of the seal (9); and means for guiding and orientating the carriage (8) on the jig (1), characterized in that the means for guiding and orientating the carriage include three rails, which are approximately parallel, with a circular cross section and integral with the jig (1), namely a first rail (11) with a shape matching the shape of the receiving surface (10) of the seal and defining the path the carriage (8) is to follow along the body (4) of the vehicle, a second rail (12) keeping the application force of the seal (9) on the receiving surface (10) of the seal along a directions still normal to the application surface of the seal, and a third rail (13) ensuring along a direction transversal to the vehicle a correct positioning of the carriage (8) with respect to the vehicle so that the seal (9) is fully flush with the geometry of the body.

2. Device for placing a seal on a motor vehicle body, said device comprising:

a jig (1) able to be placed in contact with the body of the vehicle;

a carriage (8) borne by the jig (1) and able to move on the jig (1) so as to ensure placing of the seal (9); and means for guiding and orientating the carriage (8) on the jig (1), characterized in that the carriage (8) comprises guiding rollers (14, 15, 16) which bilaterally co-operate with first, second and third rails (11, 12, 13) respectively, axes (14a) of the rollers (14) co-operating with the first rail (11) being orthogonal to axis (15a) of the rollers (15) co-operating with the second rail (12), and axes (16a) of the rollers (16) co-operating with the third rail (13) forming an angle (A) with the axes (15a) of the rollers (15) co-operating with the second rail (12).

3. Device according to claim 2, characterized in that said carriage (8) comprises a first element (18) bearing the rollers (14, 15) associated with the first and second rails (11, 12), and a second element (19) bearing the rollers (16) associated with the third rail (13) and slanted with respect to the first element (18) at said angle (A).

4. Device according to claim 3, characterized in that said second element (19) is fitted with a roller (20) for applying the seal (9) on a receiving surface (10), an axis (20a) of this roller being orthogonal to the axis (16a) of the rollers (16) associated with the third rail (13).

5. Device according to claim 4, characterized in that said application roller (20) has a throat (21) co-operating with the seal (9) so as to ensure it is applied on the receiving surface (10) and is driven in rotation by a motor (23) integral with the carriage (8).

6. Device according to claim 4, characterized in that said application roller (20) is mounted on an element (25a) able to be activated by a jack or similar member (26) integral with the carriage (8) so as to thus exert a force for applying the seal (9) on the receiving surface (10).

7. Device for placing a seal on a motor vehicle body, said device comprising:
- a jig (1) able to be placed in contact with the body of the vehicle;
- a carriage (8) borne by the jig (1) and able to move on the jig (1) so as to ensure placing of the seal (9); and
- means for guiding and orientating the carriage (8) on the jig (1), and further
- characterized in that associated with the jig (1) is a suspended adjustable stop (28) able to co-operate with a body (4) of the vehicle so as to ensure the correct positioning of the jig (1) on said body and subsequently its drive.

8. Device according to claim 7, characterized in that the jig (1) is mounted suspended and rolling on a rail (2) by means of arms (3, 30a), upon one of which (30a) is mounted said stop (28).

9. Device according to claim 7, characterized in that the jig (1) is attached to the body by brackets (32) co-operating with a roof (4a) of the body (4).

10. Device according to claim 7, characterized in that the jig (1) is fitted with a motor (33) for driving the carriage (8) by a chain (35).

11. A sealing apparatus for applying a seal to a receiving surface having a known shape, the sealing apparatus comprising:
- a jig configured to be selectively positioned;
- a carriage supported by said jig and driven by a first motor, the carriage configured to be movable along the jig while a seal is being applied to the receiving surface; and
- substantially parallel first, second and third rails mounted on said jig and configured to guide and orient said carriage along said jig; wherein:
  - the first rail defines a path followed by the carriage along the jig while the seal is being applied to the receiving surface;
  - the second rail is configured to force the seal against the receiving surface while the seal is being applied to the receiving surface; and
  - the third rail is configured to ensure correct positioning of the carriage with respect to the receiving surface.

12. The sealing apparatus according to claim 11, wherein the carriage further comprises first, second and third guide rollers which bilaterally cooperate with the first, second, and third rails, respectively, an axis of the first guide roller being orthogonal to an axis of the second guide roller, and an axis of the third guide roller forming a non-zero angle (A) with the axis of the second guide roller.

13. The sealing apparatus according to claim 12, wherein the carriage comprises a first element bearing the first and second guide rollers and a second element bearing the third guide roller, the second element being slanted at said angle (A) with respect to the first element.

14. The sealing apparatus according to claim 13, wherein the second element is fitted with an application roller driven by a second motor, the application roller having an axis that is orthogonal to the axis of the third guide roller.

15. The sealing apparatus according to claim 14, wherein:
- the application roller has a throat configured to accept a seal to be applied to the receiving surface; and
- the application roller is configured to exert a force on said seal while the seal is being applied to the receiving surface.

16. The sealing apparatus according to claim 11, wherein the jig is suspended from a rail and is provided with an adjustable stop which pre-positions the jig relative to the receiving surface.

17. The sealing apparatus according to claim 11, wherein the carriage comprises a first element bearing first and second guide rollers and a second element bearing a third guide roller, the second element being slanted at said angle (A) with respect to the first element.

\* \* \* \* \*